(12) United States Patent
Tsirkin et al.

(10) Patent No.: US 9,772,870 B2
(45) Date of Patent: Sep. 26, 2017

(54) DELIVERING INTERRUPTS TO VIRTUAL MACHINES EXECUTING PRIVILEGED VIRTUAL MACHINE FUNCTIONS

(71) Applicant: Red Hat Israel, Ltd., Raanana (IL)

(72) Inventors: Michael Tsirkin, Yokneam Yillit (IL); Paolo Bonzini, Turate (IT)

(73) Assignee: Red Hat Israel, Ltd., Raanana (IL)

( * ) Notice: Subject to any disclaimer, the term of this patent is extended or adjusted under 35 U.S.C. 154(b) by 29 days.

(21) Appl. No.: 14/608,513

(22) Filed: Jan. 29, 2015

(65) Prior Publication Data
US 2016/0224362 A1  Aug. 4, 2016

(51) Int. Cl.
*G06F 9/455* (2006.01)
*G06F 9/48* (2006.01)

(52) U.S. Cl.
CPC ........ *G06F 9/45558* (2013.01); *G06F 9/4812* (2013.01); *G06F 2009/45575* (2013.01)

(58) Field of Classification Search
None
See application file for complete search history.

(56) References Cited

U.S. PATENT DOCUMENTS

| | | |
|---|---|---|
| 8,453,143 B2 | 5/2013 | Mahalingam et al. |
| 8,656,482 B1 | 2/2014 | Tosa et al. |
| 8,832,688 B2 | 9/2014 | Tang et al. |
| 2010/0191889 A1* | 7/2010 | Serebrin ............... G06F 9/4812 710/269 |
| 2011/0197003 A1* | 8/2011 | Serebrin ............. G06F 9/45558 710/267 |
| 2013/0013869 A1* | 1/2013 | Berezecki ............... G06F 9/544 711/151 |
| 2013/0117743 A1* | 5/2013 | Neiger .................... G06F 9/455 718/1 |
| 2013/0132949 A1 | 5/2013 | Tsirkin |
| 2013/0326102 A1* | 12/2013 | Marietta ................. G06F 13/24 710/262 |
| 2014/0013326 A1 | 1/2014 | Neiger et al. |
| 2014/0137180 A1* | 5/2014 | Lukacs ................... G06F 21/53 726/1 |
| 2014/0173628 A1 | 6/2014 | Ramakrishnan |
| 2014/0189194 A1 | 7/2014 | Sahita et al. |
| 2014/0283056 A1 | 9/2014 | Bachwani et al. |

(Continued)

OTHER PUBLICATIONS

"Simple is Better: Thoughts on Hardware Virtualizaiton Exceptin (#VE)", hypervsir.blogspot.in, May 18, 2014, 3 pages http://hypervsir.blogspot.in/2014/10/thoughts-on-virtualization-exception.html.

(Continued)

*Primary Examiner* — Dong Kim
(74) *Attorney, Agent, or Firm* — Lowenstein Sandler LLP

(57) ABSTRACT

Systems and methods for delivering certain types of interrupts to virtual machines executing privileged virtual machine functions. An example method may comprise: receiving, by a hypervisor being executed by a processing device of a host computer system, a request to send an interrupt to a virtual central processing unit (vCPU) of a virtual machine; responsive to detecting that the vCPU is executing a virtual machine (VM) function, monitoring the vCPU for completion of the VM function; and responsive to detecting that execution of the VM function is complete, delivering the interrupt to the vCPU.

18 Claims, 4 Drawing Sheets

(56) References Cited

U.S. PATENT DOCUMENTS

2015/0178497 A1* 6/2015 Lukacs ............... G06F 9/461
    726/23
2015/0199514 A1* 7/2015 Tosa ............... G06F 21/554
    726/17

OTHER PUBLICATIONS

"Intel 64 and IA-32 Architectures Software Developer's Manual", Intel Corporation, Chapters 23-29, Sep. 2014, 136 pages http://www.intel.in/content/dam/www/public/us/en/documents/manuals/64-ia-32-architectures-software-developer-vol-3c-part-3-manual.pdf.

Weinstein, David "Advanced x86: Virtualization with VT-x Part 2", 162 pages http://opensecuritytraining.info/AdvancedX86-VTX_files/Virtualization_Part2.pdf (Last accessed Apr. 22, 2015).

* cited by examiner

DELIVERING INTERRUPTS TO VIRTUAL MACHINES EXECUTING PRIVILEGED VIRTUAL MACHINE FUNCTIONS

TECHNICAL FIELD

The present disclosure is generally related to virtualized computer systems, and is more specifically related to systems and methods for delivering certain types of interrupts to virtual machines executing privileged virtual machine functions.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor.

A notable design aspect in a virtualized computer system is routing and processing of interrupts. "Interrupt" herein shall refer to an event that requires a processor to execute event-specific instructions, which might involve the processor's holding the current thread of execution and/or switching contexts.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
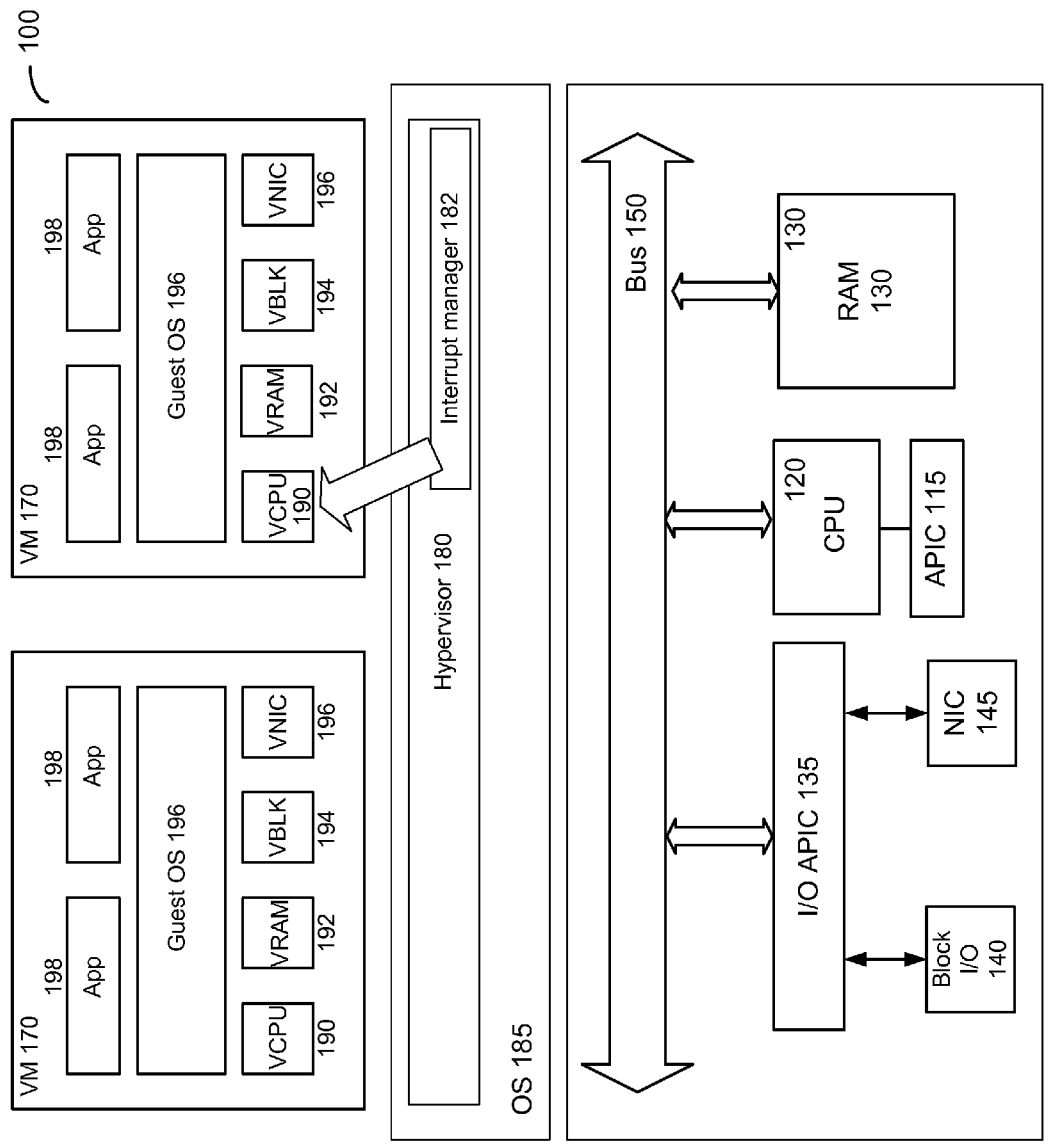
FIG. 1 depicts a high-level component diagram of an example computer system implementing the methods for delivering certain types of interrupts to virtual machines executing privileged virtual machine functions, in accordance with one or more aspects of the present disclosure.

Described herein are methods and systems for delivering certain types of interrupts to virtual machines executing privileged virtual machine functions.

Interrupts may be processed by one or more interrupt controllers such as Advanced Programmable Interrupt Controllers (APICs), including one local APIC per processor and one or more input/output (I/O) APICs connected to I/O devices. An interrupt may be addressed to any subset of processors within the system. In a computer system running one or more virtual machines, interrupts may be virtualized by the hypervisor identifying one or more virtual processors for servicing an outstanding interrupt and routing (or injecting) the interrupt message to the identified virtual processors (also referred to as virtual central processing units (vCPU)). Injectable interrupts include external interrupts, non-maskable interrupt (NMI), processor exceptions, software generated interrupts, system management interrupts, initialization interrupts, reset interrupts, and software traps.

Certain processor architectures support virtualization by providing special instructions for facilitating virtual machine execution. In certain implementations, a processor may support executing a virtual machine monitor (VMM) that acts as a host and has full control of the processor and other platform hardware. A VMM presents a virtual machine with an abstraction of one or more virtual processors. A VMM is able to retain selective control of processor resources, physical memory, interrupt management, and input/output (UO). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the VMM can retain control of platform resources. A transition from the reduced privilege level (also referred to as VMX non-root operation in certain processor architectures) to the VMM context is referred to as a VM exit and may be performed by invoking a special Instruction Set Architecture (ISA)-dependent instruction (e.g., VMCALL).

A VM function is a privileged processor operation that can be invoked by a virtual machine without performing a VM exit. VM functions may be enabled and configured by the settings of certain fields in the Virtual Machine Control Structure (VMCS). A virtual machine may invoke a VM function by using a special ISA-dependent instruction (e.g., VMFUNC). A certain processor register (e.g., EAX) may be employed to select the specific VM function being invoked. Even though the VM function code does not run with elevated privileges, it may be granted access to some privileged resources, e.g., the hypervisor memory or memory of other VMs.

In certain implementations, interrupts of certain types (e.g., the non-maskable interrupt (NMI)) are suspended during the execution of VM functions, since an NMI would cause execution of the VM function to be interrupted, thus potentially breaking its security.

Aspects of the present disclosure address the above noted and other deficiencies by providing methods and systems for delivering certain types of interrupts to virtual machines executing privileged virtual machine functions. In accordance with one or more aspects of the present disclosure, responsive to receiving a request to send an interrupt of a certain type (e.g., an NMI) to a certain vCPU, the hypervisor may ascertain (e.g., by inspecting the Extended Page Table base Pointer (EPTP) value or inspecting the code that is being executed by the virtual machine) whether the destination vCPU is currently executing a VM function.

Responsive to determining that the vCPU is currently executing a VM function, the hypervisor may delay the interrupt delivery till the VM function completes. In certain implementations, the hypervisor may run the VM function until the VM function completes. In an illustrative example, the hypervisor may modify the VMCS associated with the virtual machine to cause the VM function to exit upon completion; for example, if the termination of the VM function is signaled by a VMFUNC instruction, it may direct the processor to exit upon encountering a VMFUNC instruction. Alternatively, the hypervisor may modify a memory accessible by the virtual machine to cause the VM function to exit. Alternatively, the hypervisor may monitor the VM function code execution until the VM function returns.

Responsive to detecting the VM function completion, the hypervisor may deliver the interrupt to the vCPU, as described in more details herein below. Various aspects of the above referenced methods and systems are described in details herein below by way of examples, rather than by way of limitation.

FIG. 1 depicts a high-level component diagram of an illustrative example of a computer system 100 in accordance with one or more aspects of the present disclosure. Computer system 100 may include one or more processors 120 communicatively coupled to memory devices 130 and input/output (I/O) devices 140, 145 via a system bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In an illustrative example, an I/O device may be provided by a network interface controller (NIC) 145 or a block I/O device, such as disk 140.

Computer system 100 may further comprise one or more Advanced Programmable Interrupt Controllers (APIC), including one local APIC 115 per processor and one or more I/O APICs 135. Local APIC 115 may receive interrupts from local sources (including timer interrupts, internal error interrupts, performance monitoring counter interrupts, thermal sensor interrupts, and I/O devices connected to the processor's local interrupt pins either directly or via an external interrupt controller) and externally connected I/O devices (i.e., UO devices connected to an I/O APIC), as well as inter-processor interrupts (IPIs).

Computer system 100 may support various interrupt types, including external interrupts, non-maskable interrupt (NMI), processor exceptions, software-generated interrupts, and/or software traps. In certain processor architectures, the NMI can be generated either by an external hardware module asserting the NMI processor pin or by the processor receiving an NMI message on the system bus or the APIC serial bus. When the processor receives a NMI from either of these sources, the processor handles it immediately by calling the NMI handler (e.g., identified by interrupt vector 2). The processor also invokes certain hardware conditions to insure that no other interrupts, including NMI interrupts, are received until the NMI handler has completed executing. Also, when an NMI is received from either of the above sources, it cannot be masked by the IF flag in the EFLAGS register.

Computer system 100 may run multiple virtual machines 170, by executing a software layer 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170 as virtual devices. A virtual machine 170 may execute a guest operating system 196 which may utilize underlying virtual processors (also referred to as virtual central processing units (vCPUs)) 190, virtual memory 192, and virtual I/O devices 194, 196. One or more applications 198 may be running on a virtual machine 170 under guest operating system 196.

The address space virtualization may be implemented by the paging mechanism designed to support a virtual memory environment where a virtual machine address space is simulated with a smaller amount of random access memory (RAM) and a backing store (e.g., a disk). The memory may be divided into pages of a defined size (e.g., 4 KB). The guest operating system may maintain a page directory and a set of page tables to keep track of the pages. When a virtual machine attempts to access a memory page, it may use the page directory and page tables to translate the virtual address into a physical address. If the page being accessed is not currently in the physical memory, a page-fault exception may be generated, responsive to which the virtual machine may read the page from the backing store and continue executing the thread.

In certain implementations, host computer system 100 may implement second-level address translation mechanism to facilitate virtual machine (guest) to host address translations. In an illustrative example, guest applications 198 may reference memory locations using guest virtual addresses (e.g., represented by guest linear addresses). Responsive to receiving a memory access request, the processor may translate the referenced guest virtual address to a guest physical address using a guest page table that is managed by the guest operating system. The processor may then translate the guest physical address to the corresponding host physical address using an extended page table (EPT) that is managed by the hypervisor.

Processor 120 may support virtualization by providing special instructions for facilitating virtual machine execution, including one or more instructions facilitating execution of VM functions. A VM function is a privileged processor operation that can be invoked by a virtual machine without performing a VM exit. A virtual machine may invoke a VM function by using a special ISA-dependent instruction (e.g., VMFUNC). In certain processor architectures, a pre-defined processor register (e.g., EAX) may be employed to select a specific VM function being invoked. Even though the VM function code does not run with elevated privileges, it may be granted access to some privileged resources, e.g., the hypervisor memory or memory of other VMs.

In certain implementations, interrupts of certain types (e.g., the non-maskable interrupt (NMI)) are suspended during the execution of VM functions, since an NMI would cause execution of the VM function to be interrupted, thus potentially breaking its security. In accordance with one or more aspects of the present disclosure, hypervisor 180 may include an interrupt manager component 182 which may perform the delivery of interrupts to vCPUs 190, as described in more details herein below with reference to FIGS. 2-3.

In certain implementations, interrupt manager component 182 may be implemented as a software component invoked by hypervisor 180, and may comprise one or more code modules that implement method 300 described herein below and various auxiliary functions. Alternatively, functions of interrupt manager component 182 may be performed by hypervisor 180.

An interrupt may be addressed to any subset of processors. In a computer system running one or more virtual machines, interrupts may be virtualized by the hypervisor identifying one or more virtual processors for servicing an outstanding interrupt and routing (or injecting) the interrupt message to the identified virtual processors. Injectable interrupts include external interrupts, non-maskable interrupt (NMI), processor exceptions, software generated interrupts, system management interrupts, initialization interrupts, reset interrupts and software traps.

Figure 2:
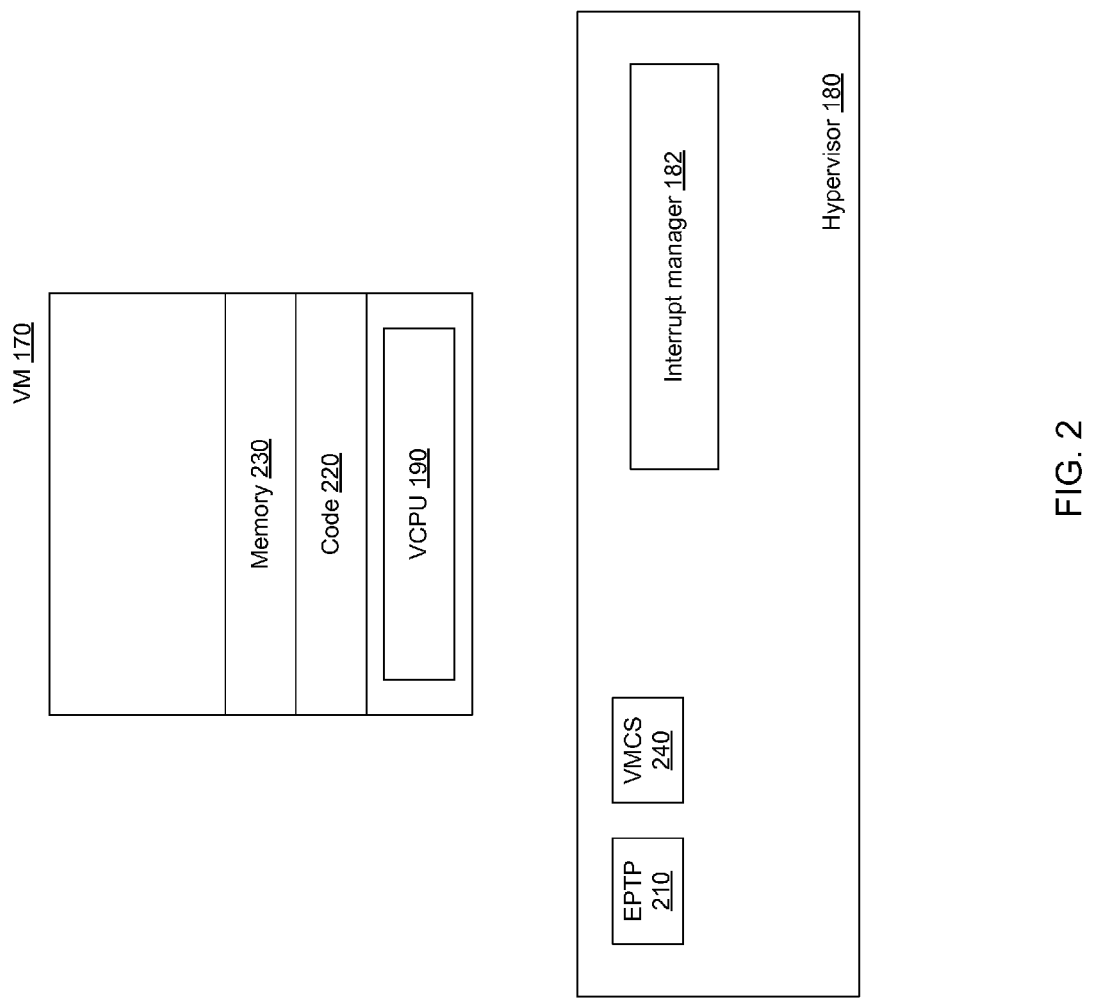
FIG. 2 schematically illustrates an example of delivering an NMI to a virtual machine executing privileged virtual machine functions, in accordance with one or more aspects of the present disclosure.

FIG. 2 schematically illustrates an example of delivering an NMI to a virtual machine executing privileged virtual machine functions, in accordance with one or more aspects of the present disclosure. Responsive to receiving a request to send an interrupt of a certain type (e.g., an NMI) to a certain vCPU, interrupt manager component 182 of hypervisor 180 may ascertain whether destination vCPU 190 is currently executing a VM function. In an illustrative example, interrupt manager component 182 may determine whether destination vCPU 190 is currently executing a VM function by inspecting EPTP value 210 (in certain implementations, the EPTP is initialized on a VM entry to a value stored in a certain VMCS field and may be modified in the VM function execution mode; thus, if EPTP value is equal to the value that was set when entering VM function execution mode, the vCPU may be assumed to execute a VM function). In another illustrative example, interrupt manager component 182 may determine whether destination vCPU 190 is currently executing a VM function by inspecting code 220 that is being executed by the vCPU.

Responsive to determining that the vCPU is currently executing a VM function, interrupt manager component 182 may delay the interrupt delivery till the VM function completes. In certain implementations, hypervisor 180 may run the VM function until the VM function completes. In an illustrative example, interrupt manager component 182 may modify VMCS 230 associated with the virtual machine to cause the VM function to exit upon completion. Alternatively, interrupt manager component 182 may modify a memory 240 accessible by the virtual machine to cause the VM function to exit. Alternatively, interrupt manager component 182 may monitor the VM function code execution until the VM function returns. Responsive to detecting the VM function completion, interrupt manager component 182 may deliver the interrupt to the vCPU, as described in more details herein below with reference to FIG. 3.

Figure 3:
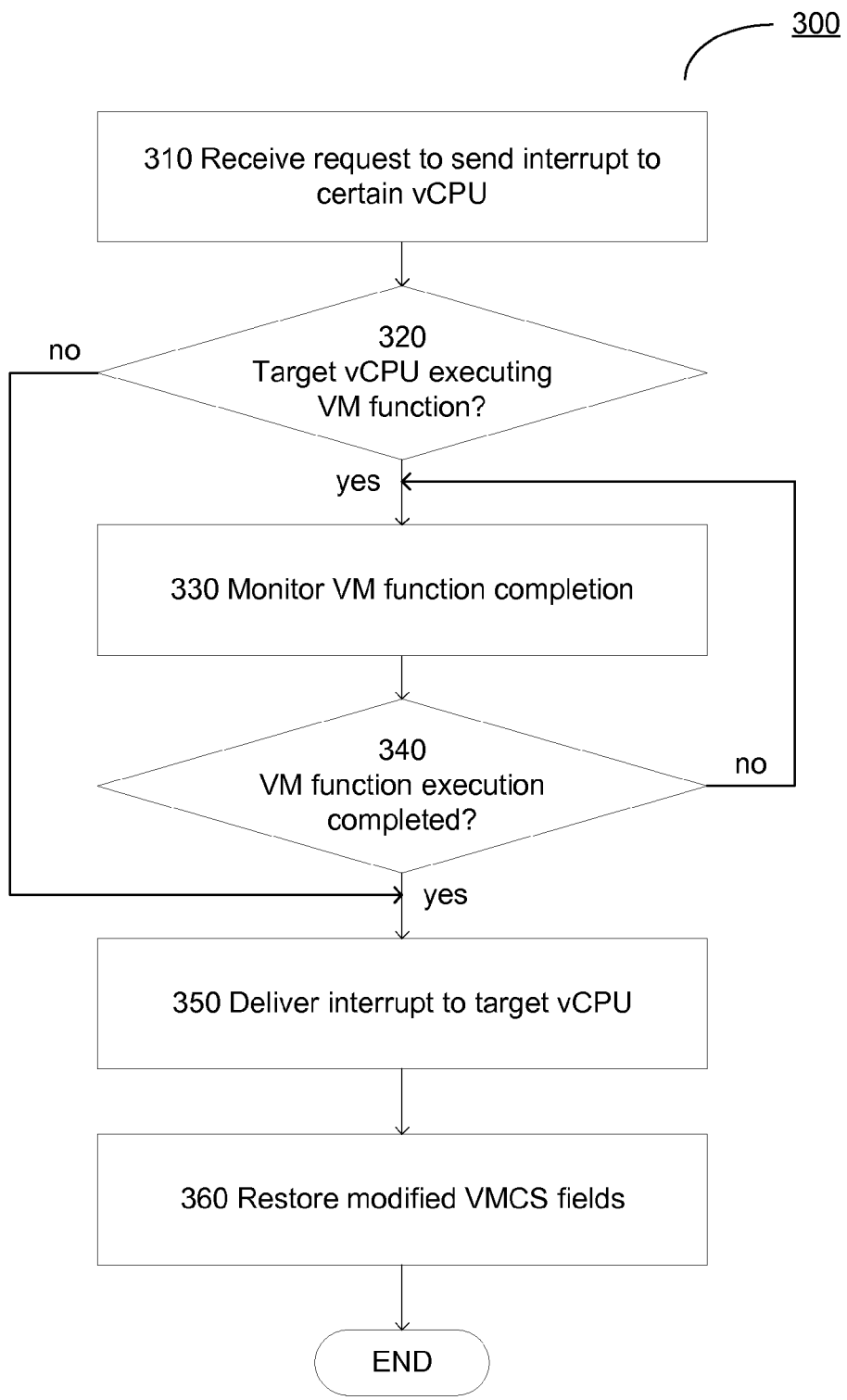
FIG. 3 depicts a flow diagram of a method for delivering certain types of interrupts to virtual machines executing privileged virtual machine functions, in accordance with one or more aspects of the present disclosure.

FIG. 3 depicts a flow diagram of one illustrative example of a method 300 for delivering certain types of interrupts to virtual machines executing privileged virtual machine functions, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a hypervisor being executed by a processing device of a host computer system implementing the method may receive a request to send an interrupt of a certain type to a vCPU of a virtual machine. In an illustrative example, the interrupt may be represented by a NMI. Alternatively, the interrupt may be provided by an external interrupt, a processor exception, a software-generated interrupt, a software trap, a system management interrupt, an initialization interrupt, a reset interrupt, or an inter-processor interrupt.

Responsive to ascertaining, at block 320, that the destination vCPU is currently executing a VM function, the processing may continue at block 330; otherwise, the method may branch to block 350. In an illustrative example, the hypervisor may determine whether the destination vCPU is currently executing a VM function by inspecting the EPTP value, as described in more details herein above. In another illustrative example, the hypervisor may determine whether the destination vCPU is currently executing a VM function by inspecting the code that is being executed by the destination vCPU, as described in more details herein above.

At block 330, the hypervisor may delay the interrupt delivery till the VM function completes. In certain implementations, the hypervisor may run the VM function until the VM function completes. In an illustrative example, the hypervisor may modify the VMCS associated with the virtual machine to cause the VM function to exit upon completion; for example, if the termination of the VM function is signaled by a VMFUNC instruction, it may direct the processor to exit upon encountering a VMFUNC instruction. Alternatively, the hypervisor may modify a memory accessible by the virtual machine to cause the VM function to exit upon completion. Alternatively, the hypervisor may modify the VM function code being executed, to cause the VM function to exit upon completion. Alternatively, the hypervisor may monitor the VM function code execution by the vCPU until the VM function returns.

Responsive to detecting, at block 340, the VM function completion, the hypervisor may, at block 350, deliver the interrupt to the destination vCPU.

At block 360, the hypervisor may restore any modified VMCS fields, to disable VM function exits if those were previously enabled. Upon completing the operations referenced by block 360, the method may terminate.

Figure 4:
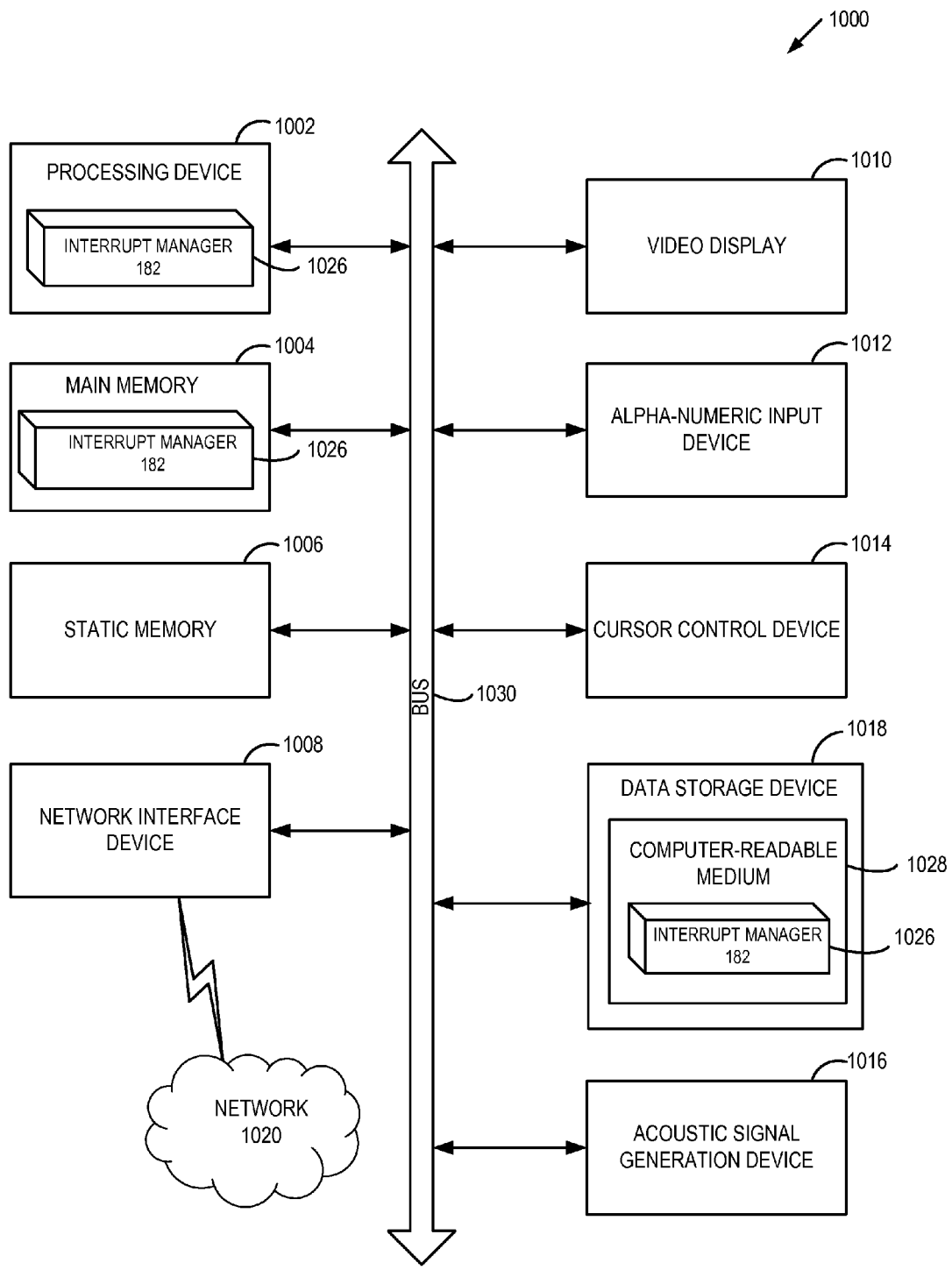
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute interrupt manager component 182 implementing method 300 for delivering certain types of interrupts to virtual machines executing privileged virtual machine functions.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of interrupt manager component 182 implementing method 300 for delivering certain types of interrupts to virtual machines executing privileged virtual machine functions.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   receiving, by a processing device executing a hypervisor of a host computer system, a request to deliver an interrupt to a virtual central processing unit (vCPU) of a virtual machine;
   virtualizing the interrupt to generate a virtualized interrupt directed to the vCPU;
   refraining from delivering the virtualized interrupt to the vCPU while the vCPU is executing a virtual machine (VM) function;
   monitoring the vCPU for completion of the VM function, wherein the VM function represents a privileged operation invoked by the virtual machine without performing a VM exit;
   in view of the monitoring of the vCPU for completion of the VM function, modifying a code of the VM function to cause the VM function to exit; and
   responsive to detecting that execution of the VM function is complete, delivering the virtualized interrupt to the vCPU.

2. The method of claim 1, wherein the interrupt is represented by one of: a non-maskable interrupt (NMI), an external interrupt, a processor exception, a software-generated interrupt, a software trap, a system management interrupt, an initialization interrupt, a reset interrupt, or an inter-processor interrupt.

3. The method of claim 1, wherein detecting that the vCPU is executing a virtual machine (VM) function comprises inspecting an extended page table pointer (EPTP).

4. The method of claim 1, wherein detecting that the vCPU is executing a virtual machine (VM) function comprises inspecting a memory location accessible by the virtual machine.

5. The method of claim 1, further comprising:
   in view of monitoring of the vCPU for completion of the VM function, modifying a virtual machine control structure (VMCS) associated with the virtual machine to cause the VM function to exit.

6. The method of claim 1, further comprising:
   in view of monitoring of the vCPU for completion of the VM function, modifying a memory accessible by the virtual machine to cause the VM function to exit.

7. The method of claim 1, further comprising:
   in view of monitoring of the vCPU for completion of the VM function, running the VM function by the hypervisor until the VM function completes.

8. The method of claim 1, further comprising suspending VM function exits responsive to delivering the interrupt.

9. A system comprising:
   a memory; and
   a processing device, operatively coupled to the memory, to:
     receive, by a hypervisor being executed by the processing device, a request to deliver an interrupt to a virtual central processing unit (vCPU) of a virtual machine;
     virtualize the interrupt to generate a virtualized interrupt directed to the vCPU;
     refrain from delivering the virtualized interrupt to the vCPU while the vCPU is executing a virtual machine (VM) function;
     monitor the vCPU for completion of the VM function, wherein the VM function represents a privileged operation invoked by the virtual machine without performing a VM exit;
     modify a code of the VM function to cause the VM function to exit; and
     responsive to detecting that execution of the VM function is complete, deliver the virtualized interrupt to the vCPU.

10. The system of claim 9, wherein the interrupt is represented by one of: a non-maskable interrupt (NMI), an external interrupt, a processor exception, a software-generated interrupt, a software trap, a system management interrupt, an initialization interrupt, a reset interrupt, or an inter-processor interrupt.

11. The system of claim 9, wherein to detect that the vCPU is executing a virtual machine (VM) function the processing device is further to inspect an extended page table pointer (EPTP).

12. The system of claim 9, wherein to detect that the vCPU is executing a virtual machine (VM) function the processing device is further to inspect a memory location accessible by the virtual machine.

13. The system of claim 9, wherein the processing device is further to modify a virtual machine control structure (VMCS) associated with the virtual machine to cause the VM function to exit.

14. The system of claim 9, wherein the processing device is further to modify a code of the VM function to cause the VM function to exit.

15. The system of claim 9, wherein the processing device is further to run the VM function by the hypervisor until the VM function completes.

16. The system of claim 9, wherein the processing device is further to suspend VM function exits responsive to delivering the interrupt.

17. A computer-readable non-transitory storage medium comprising executable instructions that, when executed by a processing device, cause the processing device to:
   receive, by a hypervisor being executed by the processing device, a request to deliver an interrupt to a virtual central processing unit (vCPU) of a virtual machine;
   virtualize the interrupt to generate a virtualized interrupt directed to the vCPU;

refrain from delivering the virtualized interrupt to the vCPU while the vCPU is executing a virtual machine (VM) function;

monitor the vCPU for completion of the VM function, wherein the VM function represents a privileged operation invoked by the virtual machine without performing a VM exit;

modify a code of the VM function to cause the VM function to exit; and responsive to detecting that execution of the VM function is complete, deliver the virtualized interrupt to the vCPU.

18. The computer-readable non-transitory storage medium of claim 17, wherein the interrupt is represented by one of: a non-maskable interrupt (NMI), an external interrupt, a processor exception, a software-generated interrupt, a software trap, a system management interrupt, an initialization interrupt, a reset interrupt, or an inter-processor interrupt.

* * * * *